United States Patent [19]
Anderson et al.

[11] Patent Number: 4,489,442
[45] Date of Patent: Dec. 18, 1984

[54] SOUND ACTUATED MICROPHONE SYSTEM

[75] Inventors: Carl R. Anderson, Wilmette; William R. Bevan; Robert B. Schulein, both of Evanston, all of Ill.; Alan D. Smith, Lubbock, Tex.

[73] Assignee: Shure Brothers, Inc., Evanston, Ill.

[21] Appl. No.: 429,430

[22] Filed: Sep. 30, 1982

[51] Int. Cl.[3] .......................... H04R 3/00; H04M 3/56

[52] U.S. Cl. .......................................... 381/81; 381/92; 381/103; 381/107; 381/110; 381/122; 179/121 D; 179/18 BC

[58] Field of Search ............. 179/18 BC, 81 B, 100 L, 179/121 D; 381/71, 110, 57, 80, 81, 83, 91–94, 122–124, 56, 101–103, 104, 107, 108

[56] References Cited

U.S. PATENT DOCUMENTS

| | | | |
|---|---|---|---|
| 3,213,372 | 10/1965 | Kurvits | 455/225 |
| 3,437,758 | 4/1969 | Clement | 179/18 BG |
| 3,496,481 | 2/1970 | Torick et al. | 330/134 |
| 3,588,360 | 6/1971 | Knox | 179/81 B |
| 3,601,530 | 8/1971 | Edson et al. | 179/18 BC X |
| 3,751,602 | 8/1973 | Breeden | 179/81 B |
| 3,755,625 | 8/1973 | Maston | 179/18 BC |
| 3,814,856 | 6/1974 | Dugan | 381/57 |
| 3,818,139 | 6/1974 | Snyder | 179/18 BC |
| 3,944,736 | 3/1976 | Shepard | 358/185 |
| 3,947,639 | 3/1976 | Nicholas et al. | 179/18 BC |
| 3,958,084 | 5/1976 | Nicholas | 179/18 BC |
| 3,979,563 | 9/1976 | Kita et al. | 179/99 R |
| 3,992,584 | 11/1976 | Dugan | 381/93 X |
| 4,006,310 | 2/1977 | Bayer | 179/37 |
| 4,090,032 | 5/1978 | Schrader | 179/18 BC |
| 4,099,025 | 7/1978 | Kahn | 179/18 BC |
| 4,149,032 | 4/1979 | Peters | 381/58 |
| 4,198,705 | 4/1980 | Massa | 367/126 |
| 4,215,241 | 7/1980 | Pinkney, Jr. | 367/197 |
| 4,359,602 | 11/1982 | Ponto et al. | 381/81 |

FOREIGN PATENT DOCUMENTS

| | | | |
|---|---|---|---|
| 2015849 | 9/1979 | United Kingdom | 179/18 BC |

OTHER PUBLICATIONS

"1628A Automatic Microphone Mixer" published by Altec.
"Spectrum–Master Model 3535 Log–8 Microphone Mixer" published by Rauland–Borg Corporation.
"Automatic Microphone Mixing" by Dan Dugan published by the Journal of the Audio Engineering Society for the Jul./Aug., 1975 issue.
"Voice–Matic Microphone Mixer DE–4013" published by Industrial Research Products, Inc.
"Model 7510 Automatic Microphone Mixer" published by JBL Processional Division.

*Primary Examiner*—Gene Z. Rubinson
*Assistant Examiner*—W. J. Brady
*Attorney, Agent, or Firm*—Allegretti, Newitt, Witcoff & McAndrews, Ltd.

[57] ABSTRACT

A microphone channel is constructed from a pair of unidirectional microphone elements mounted back-to-back for monitoring sound coming from a predetermined area of space. The output signals of each microphone element are converted to D.C. logarithmic signals which are compared for gating an electrical output signal of a microphone element to the output/amplifying system.

14 Claims, 10 Drawing Figures

Fig. 1
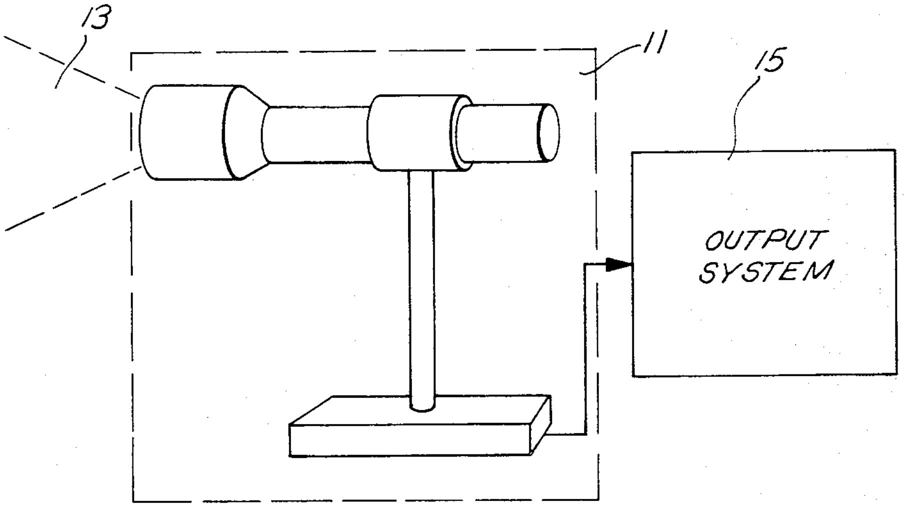
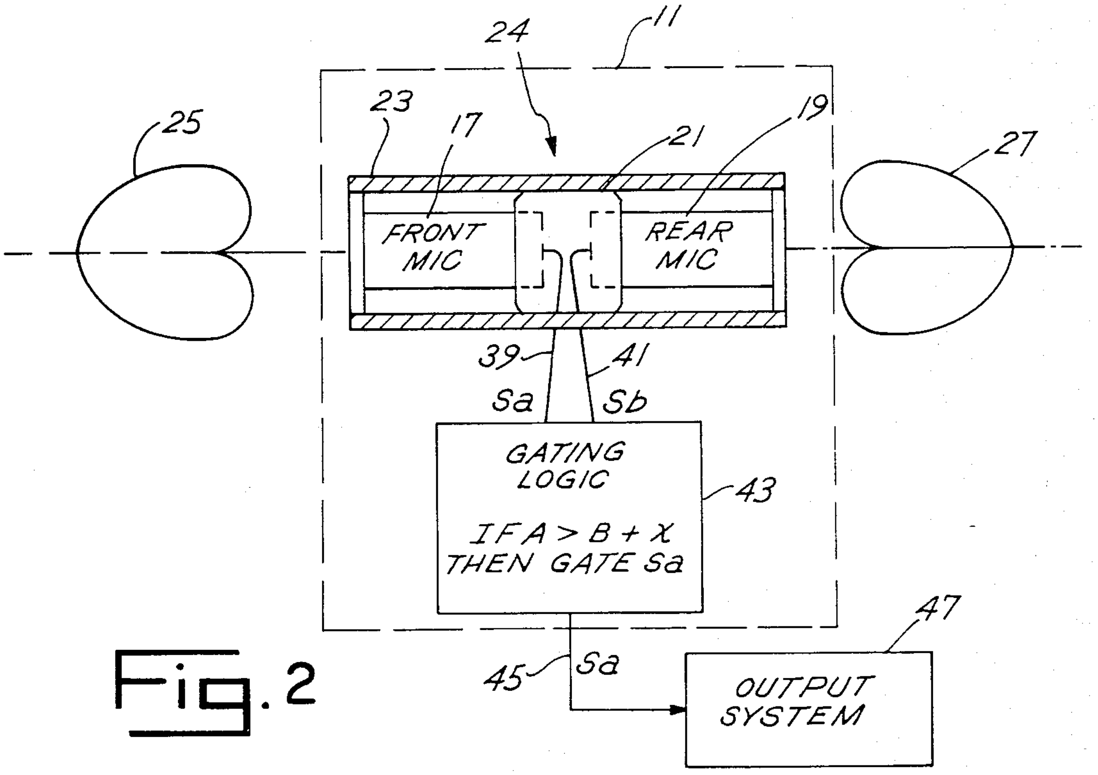
Fig. 2

SOUND ACTUATED MICROPHONE SYSTEM

BACKGROUND OF THE INVENTION

This invention relates to an acoustic detection scheme involving an array of microphone elements and associated electronics. The elements are arranged so as to differentiate between the sound generated by a desired acoustic source and that of an undesired source. The region of space from which these signals originate determine whether they are desired or undesired.

A specific embodiment of this invention relates to a microphone sound pickup system and, more particularly, to a system having multiple microphones with each microphone being individually actuable in response to sound coming from a predetermined region of space relative to the microphone.

Multiple microphone systems have inherent disadvantages. For example, in a conference room where several microphones are utilized by persons sitting at a conference table, each microphone picks up not only its respective speaker's voice, but the voices of others in the room as well as ambient noise and reverberations. Also, the number of microphones being used reduces the gain of the system before acoustical feedback occurs.

One solution to this problem is to hire an operator to monitor the people speaking and manually actuate only one microphone at a time to provide one microphone input to the amplifier/output system. This is costly and often the speakers act too quickly for the operator to follow.

It is therefore, an object of the present invention to provide a microphone system which automatically controls the "on" condition of a microphone channel in conjunction with the need of the associated talker.

It is also an object of the present invention to provide a multiple microphone system that automatically adjusts the gain of the system in accordance with the number of "on" microphone channels.

It is a further object of the present invention to provide an attentuated microphone signal in the "off" condition to smooth system operation, whose level is automatically adjusted according to the number of microphone channels.

It is a further object of the present invention to provide a microphone that automatically gates "on" and "off" in response to a talker's voice being received from a particular region of space relative to the microphone.

It is a further object of the present invention to provide a microphone system which is easily installed by a person lacking specialized or set-up knowledge of the system.

It is a further object of the present invention to provide a microphone system utilizing conventional wiring and being usable with other conventional sound reinforcement components.

It is a further object of the present invention to provide a control signal output for each channel to control external devices or functions.

It is still a further object of the present invention to provide control signal inputs to affect operation of each channel, such as muting, channel priority, channel override, and the like.

SUMMARY OF THE INVENTION

These and other objects of the invention are achieved in a single microphone channel constructed from a plurality of microphone elements mounted relative to one another for monitoring sound coming from a predetermined region of space. The output signals of each microphone element of the channel are monitored for gating electrical output signals of an element to the output/amplifying system. A microphone system may be constructed from a plurality of such microphone channels.

In one embodiment, the gating of a microphone channel signal to the output/amplifying system also serves to inhibit further gating of other microphone channel signals. In another embodiment in which a plurality of microphone channels may be gated on simultaneously, the number of said channels occurring automatically reduces the gain of the output/amplifying system.

BRIEF DESCRIPTION OF THE FIGURES

FIG. 1 illustrates a diagrammatic drawing of an embodiment of a sound actuated microphone channel of the present invention;

FIG. 2 illustrates a diagrammatic representation and block diagram of the microphone channel of FIG. 1;

DESCRIPTION OF THE PREFERRED EMBODIMENT

Figure 3:
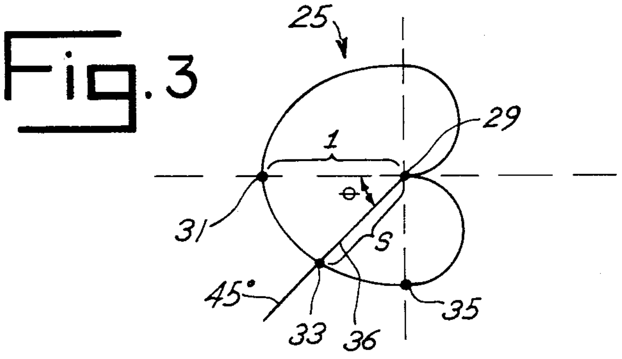
FIG. 3 illustrates a graphical representation of the polar pattern output response of a unidirectional microphone element of the microphone channel of FIG. 1.

The following terms are used in describing the preferred embodiments of the present invention:

1. Microphone Element—A single acoustic transducer that converts acoustical energy to electrical energy. The polar pattern of this element is not restricted.
2. Microphone Array—Consists of two or more microphone elements.
3. Microphone Channel—Consists of two or more microphone elements (microphone array) and their associated decision making and gating electronics.
4. Microphone System—A device constructed from two or more microphone channels.

Referring to FIG. 1, a microphone channel 11 is shown in which the surrounding space is monitored. Only sound coming from a predetermined region of space 13 and received by the microphone channel allows the microphone signal to be passed to an output system 15. Other microphone channels 11 (not shown) may be connected to output system 15 to form a multiple microphone system.

FIG. 2 illustrates one embodiment of a microphone channel 11 which is turned "on" only by sounds coming from a predetermined area of space. In this embodiment, microphone channel 11 is constructed from a pair of unidirectional microphone elements 17, 19 which are fixed in a back-to-back relationship by a clamping member 21. Both microphone elements 17, 19 are positioned within a single housing 23 forming the housing of a microphone array 24. Microphone element 17 is positioned at the front of microphone array 24 while microphone element 19 is positioned at the rear of microphone array 24. Both unidirectional microphone elements are closely spaced to each other.

Microphone element 17 receives sound in accordance with its unidirectional characteristics. A cardioid pattern 25 represents the relative sensitivity of microphone element 17 to sound originating from various angles of space. Similarly, microphone element 19 responds to sound from various angles of space as represented by pattern 27.

The cardioid patterns 25, 27 may be described with reference to FIG. 3. A fixed level of sound pressure originating directly in front of microphone element 17 along its axis will cause, for example, a reference maximum voltage output from the microphone element. This reference voltage output is conveniently referred as 0 decibels (0 dB) and is represented on graphical pattern 25 by the distance between center point 29 and a point 31 located on axis in front of point 29. The relative value of the voltage output of the microphone element due to the same fixed level of sound pressure but emanating from an angle $\theta$, 45° off axis, for example, is represented by the distance between center point 29 and a point 33 located on pattern 25 at 45° off axis to the front of center point 29. The distances of the two points 31, 33 with respect to center point 29 represents the relative sensitivities of the microphone element, in decibels, to sound directed at 0° and 45°, respectively, to the front of the microphone element.

As demonstrated by the cardioid pattern 25, the relative sensitivity of the microphone element decreases as the direction of sound moves off axis from the front of the microphone element. At point 35 on the pattern, which represents the relative output caused by sound at 90° of microphone element 17, the voltage output of the microphone element has dropped by approximately six decibels (6 dB), or to one-half of the reference voltage, since decibels represent 20 times the base ten logarithm of a ratio.

As sound is directed from angles greater than 90°, the sensitivity of the microphone rapidly decreases until at 180° microphone element 17 exhibits substantially no response to sound input. The foregoing discussion of polar pattern 25 represents the theoretical functioning of a unidirectional microphone element. This functioning may be represented mathematically as $S=20\log[\frac{1}{2}(1+\cos\theta)]$ as shown in FIG. 3, where S is the voltage output in decibels represented by the length of the line 36 and $\theta$ is the angle off axis from the front of the microphone element, as shown.

Figure 4:
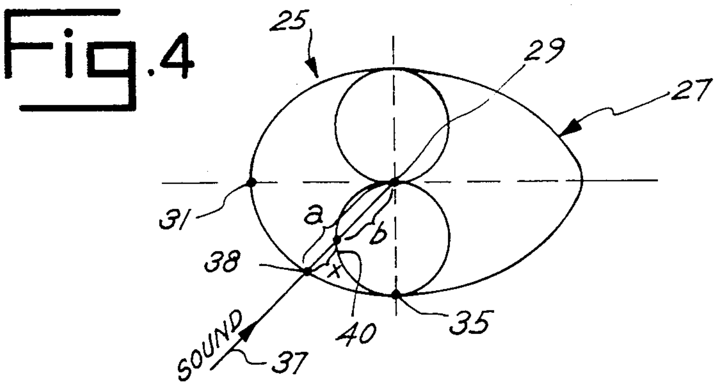
FIG. 4 illustrates a graphical representation of the polar pattern output responses of a pair of unidirectional microphone elements of the microphone channel of FIG. 1.

When microphone elements 17, 19 are positioned in a back-to-back relationship, as that shown in FIG. 2, the cardioid sensitivity patterns of each microphone element may be overlapped to facilitate comparison as illustrated in FIG. 4. Where, for example, sound is directed along at the angle indicated by line 37, the decibel level of the output of front microphone element 17 is represented by a distance "a", the distance between center point 29 and point 38 on pattern 25; the decibel level of the output of rear microphone element 19 is represented by a distance "b", the distance between center point 29 and point 40 on pattern 27. The decibel difference between the outputs of the two microphone elements is thus represented by "x", the distance between points 38, 40.

The decibel level "x" may be utilized to define the spatial area 13 (FIG. 1) for which the microphone channel is turned "on". For example, as line 37 (FIG. 4) is rotated about center point 29 between the front point 31 and the 90° point 35, the value of "x" decreases. By selecting a particular value for "x", a line 37 is defined which may be utilized as the boundary line of spatial area 13 for which the microphone channel 11 is turned "on". Whenever the decibel level of the output of front microphone element 17, i.e., "a", is greater than the decibel level of the output of rear microphone element 19, i.e., "b", by at least the preset value of "x", then sound is determined to be emanating from spatial area 13. By measuring the relative levels of the outputs of microphone elements 17, 19, microphone channel 11 may be selectively activated to transmit the sound received by front microphone element 17 to the output system 15.

Referring again to FIG. 2, front microphone element 17 develops an electrical signal "Sa" along a conductor 39 in response to acoustic sound waves. Signal Sa has a relative decibel level of "a" as discussed with respect to FIG. 4. Similarly, rear microphone element 19 develops an electrical signal "Sb" along a conductor 41 in response to received sound. Signal Sb has a relative decibel level "b" as discussed with respect to FIG. 4. Conductors 39, 41 feed their respective electrical signals to a gating logic 43.

Gating logic 43 monitors the magnitudes of the two signals Sa, Sb relative to one another. Signal Sa is passed along an output conductor 45 to an output system 47 depending on the signal strength of signal Sa relative to signal Sb. If signal Sa exceeds the strength of signal Sb by, for example, 9.54 dB (represented by the value "x" as discussed with respect to FIG. 4), then logic 43 gates signal Sa onto output conductor 45. If signal Sa does not exceed signal Sb, for example, by at least 9.54 dB, then no signal is developed along conductor 45.

Microphone channel 11 thus is enabled to sounds arriving from its front in a generally conical spatial area 13 as, for example, at or less than a 60° angle off axis to the front of microphone channel 11. As understood, discrimination thus is obtained against loud reverberant sound and diffuse room noise which would produce equal outputs from microphone elements 17, 19.

As will suggest itself, spatial region 13 may be configured in other geometrical forms. For example, mor than two microphone elements may be used, as well as using microphone elements having different sensitivity patterns other than cardioid, e.g., bi-directional or omnidirectional microphones. Further, the relative physical positioning of the microphones may be varied from that shown in FIG. 2 to introduce further differences in microphone element output levels based upon source to microphone element distances in order to define spatial area 13. Also, gating logic 43 may be constructed in accordance with a particular difference level "x" as well as taking into consideration the number and position of microphones, in order to gate a selected signal(s) to output system 47.

Figure 5:
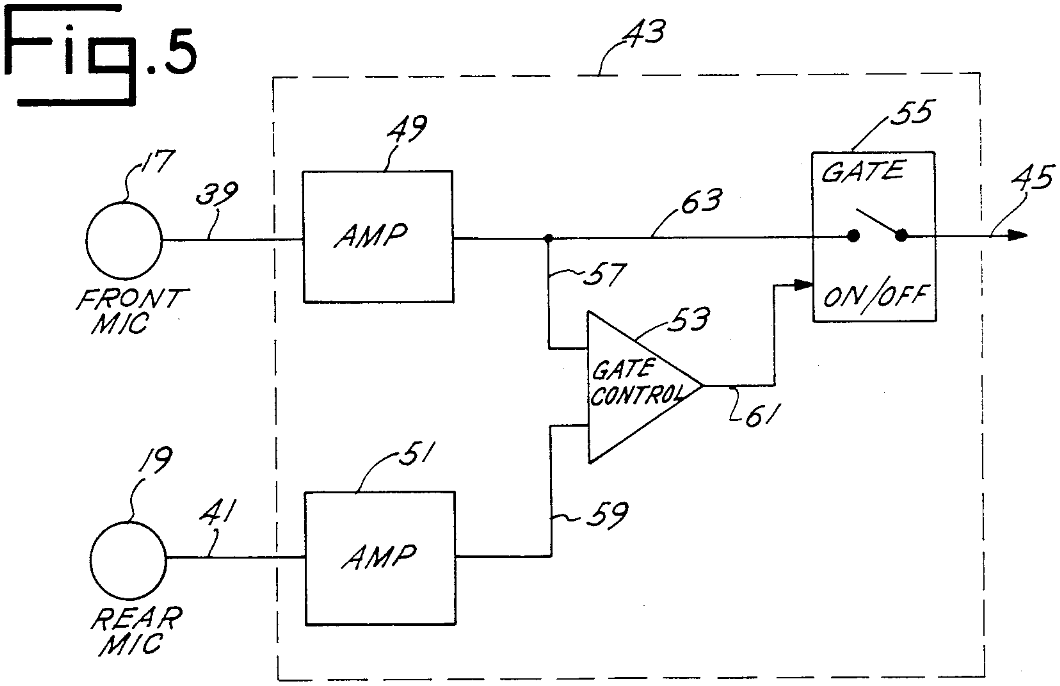
FIG. 5 illustrates a block circuit diagram of a portion of the microphone channel of FIG. 1.

Gating logic 43 is shown in more detail in FIG. 5. Output signals from front microphone element 17 and rear microphone element 19 are fed to a pair of preamplifiers 49, 51, respectively. Amplifier 49 outputs the front microphone element signal in amplified form to both a gate control 53 and a logic controlled audio gate 55. Amplifier 51 passes the amplified output of rear microphone element 19 solely to gate control 53.

Gate control 53 monitors the two microphone element signals along conductors 57, 59 for providing a logic ON or a logic OFF signal along its output conductor 61. When the signal appearing on conductor 57 exceeds the signal on conductor 59 by, for example, 9.54 dB, gate control 53 generates a logic ON signal along conductor 61. So long as the signal on conductor 57 does not exceed the signal along conductor 59 by 9.54 dB, gate control 53 will not generate a logic ON signal along conductor 61.

Gate 55 responds to the logic signal developed along conductor 61 in order to control its output along conductor 45. Whenever conductor 61 is at a logic ON state, gate 55 is closed, passing the signal from amplifier 49 via a conductor 63 to output conductor 45. When a logic OFF signal appears on conductor 61, gate 55 opens, preventing the signal on conductor 63 from passing to output conductor 45.

Figure 6:
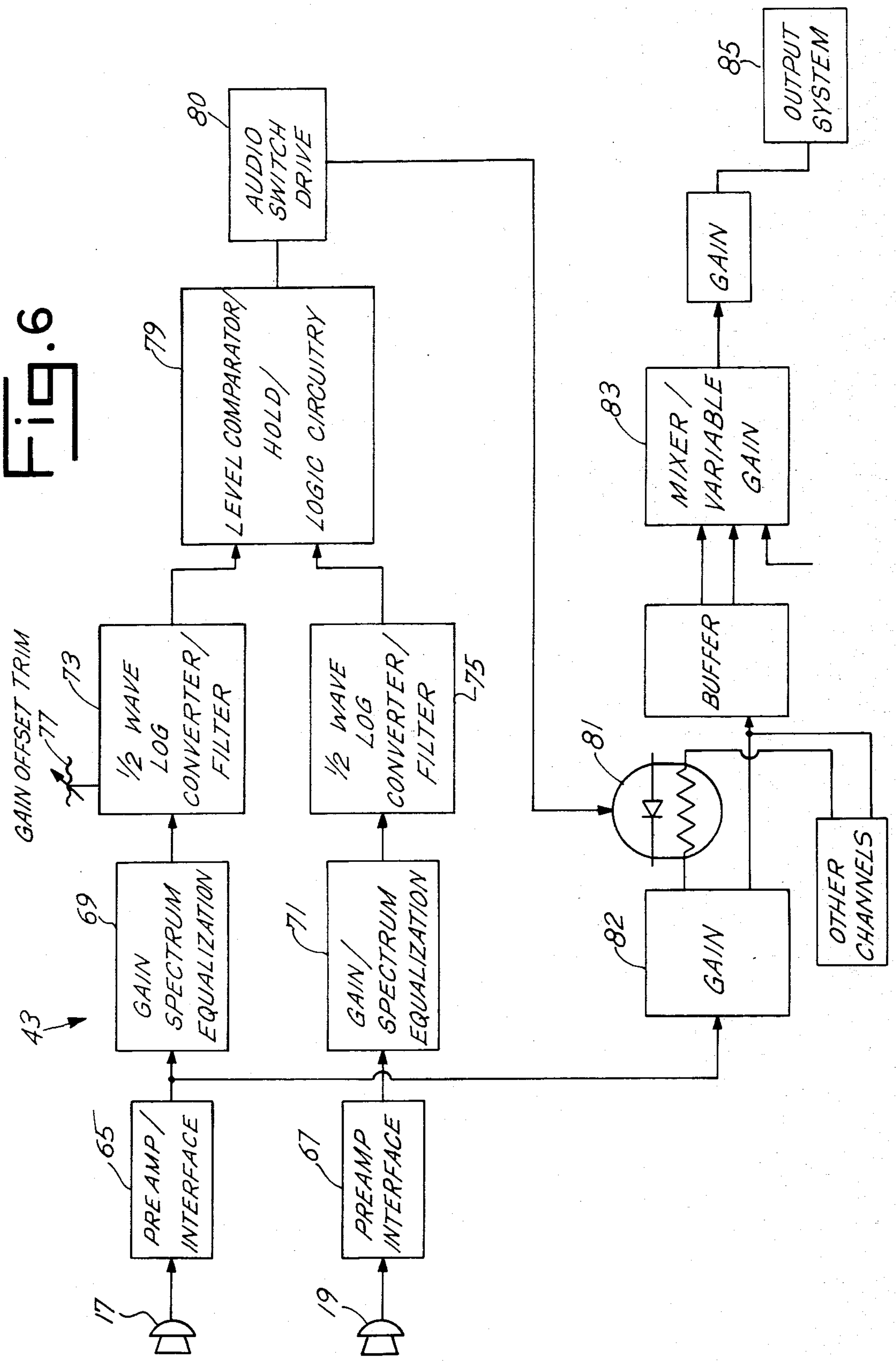
FIG. 6 illustrates a detailed block diagram of the circuitry configuration of the microphone system using the microphone channel of FIG. 1.

Referring to FIG. 6, a block diagram of a preferred embodiment of gating logic 43 is illustrated. Front microphone element 17 and rear microphone element 19 are electrically connected to respective preamplifier-/interface circuits 65, 67. After preamaplification, the microphone element signals enter respective gain and spectrum equalization circuits 69, 71 which serve to modify the microphone element signals in accordance with gain and frequency response criteria.

Once modified, the microphone element signals pass to respective half-wave log converter/filter circuits 73, 75. The modified microphone element signals are half-wave rectified and converted to logarithmically valued D.C. signals. A gain offset trim 77 (internal adjustment) serves to set the signal level decibel difference for gating. The gain offset trim 77 serves to offset the D.C. output level of the front converter/filter circuit 73 by, for example, an equivalent audio level difference of 9.54 dB.

The output D.C. signals of converter/filter circuits 73, 75 are transmitted to a level comparator/hold/logic circuitry 79 where the D.C. signals are compared for equality. In response to the comparison, comparator/-hold/logic circuitry 79 actuates a main resistive switch 81, via a drive circuit 80, for gating the front microphone element signal to the output system.

The front microphone element signal is amplified at 82 prior to gating through main resistive switch 81. The signals of a plurality of such microphone channels are combined by mixing networks 83 and then the mixed signal is transmitted to output system 85.

Figure 7:
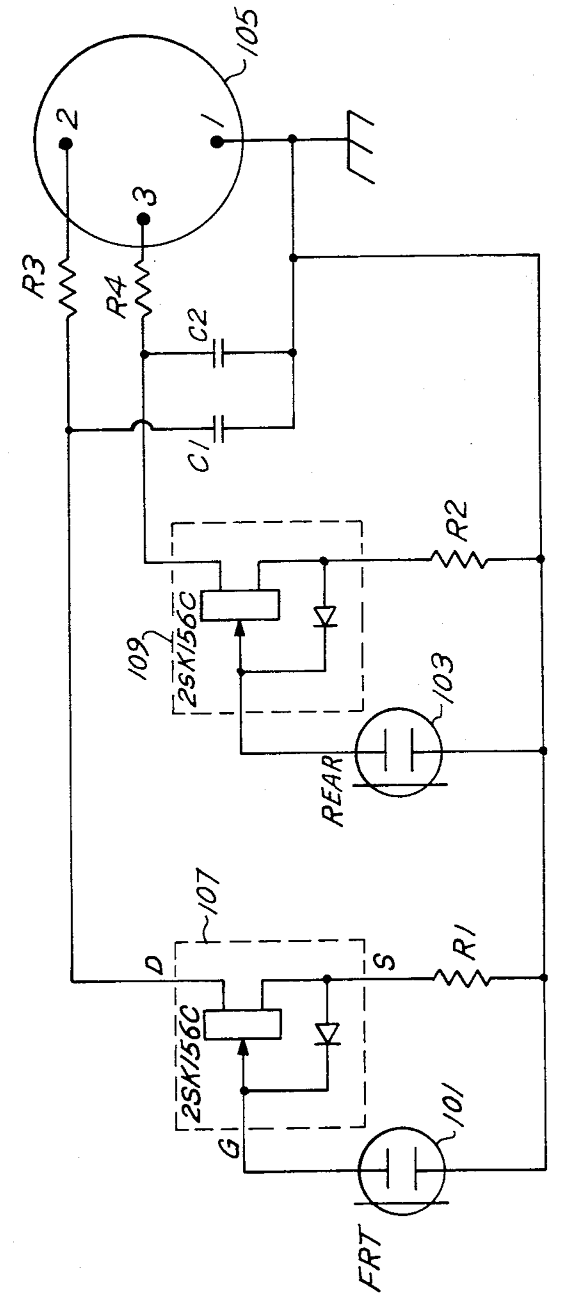
FIGS. 7, 8, 9 and 10 are circuit schematics of portions of the circuitry configuration of the microphone system of FIG. 6.
Figure 8:
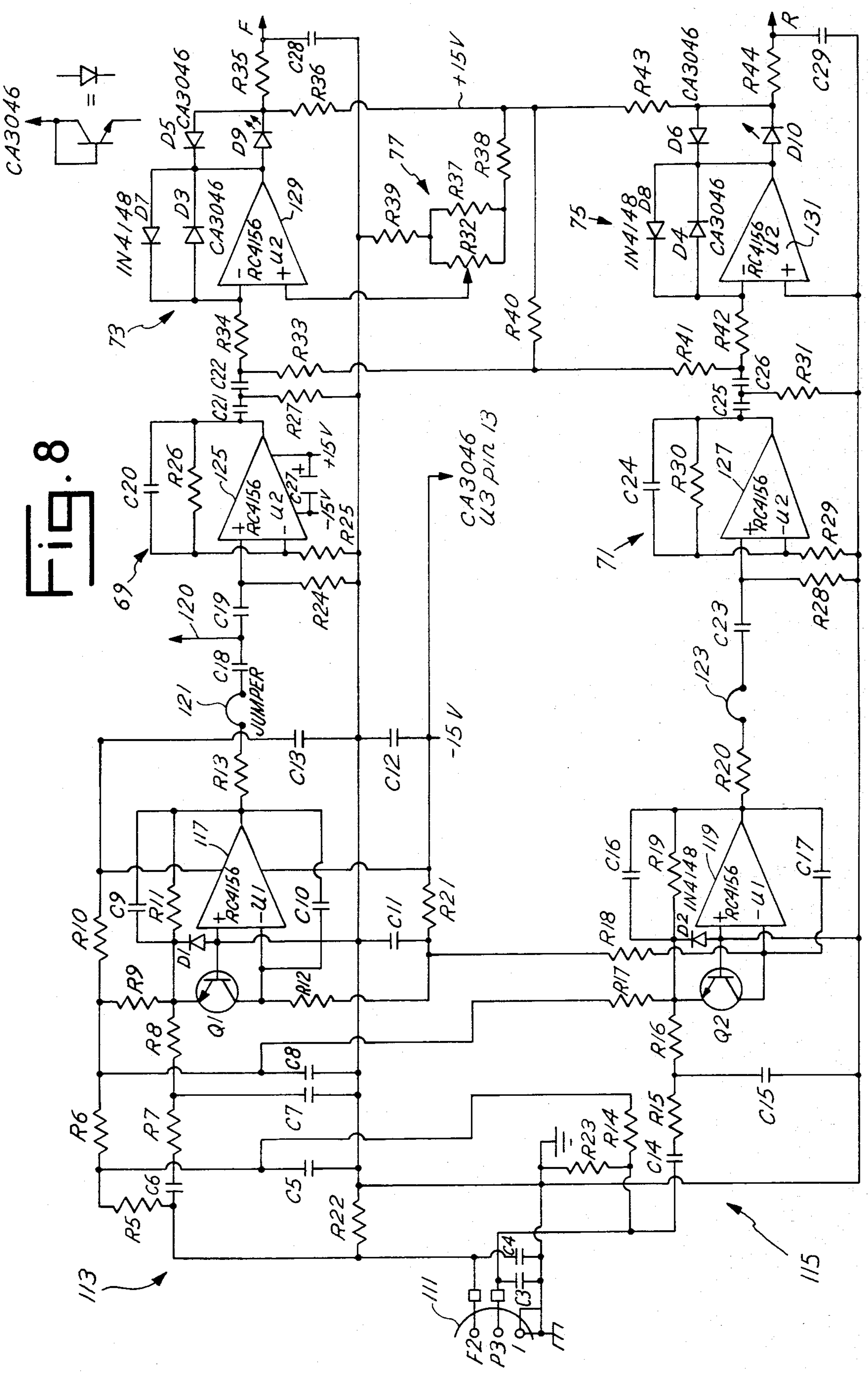

Preamplifier/interface circuits 65, 67 are shown in greater detail in FIGS. 7 and 8. A first portion of interface circuits 65, 67 is shown in FIG. 7 and a second portion is shown in FIG. 8. The first portion includes a front and rear transducer 101, 103 of respective unidirectional microphone elements 17, 19. The transducers are interconnected to a 3-terminal output connector 105 via interface circuitry including a pair of FET impedance converters 107, 109, resistors R1 through R4, and capacitors C1, C2, connected as shown.

The first portion of the preamplifier/interface circuit serves to transmit the two microphone element signals over one 3-wire cable (not shown) which is connected to connector 105. Power is also carried by the 3-wire cable back into the first portion of the preamplifier/interface. This permits conventional cable to be used with the microphone. The circuitry of FIG. 7 may be housed in microphone channel 11 (FIG. 1) and the 3-wire cable may be used to connect microphone channel 11 to the output system 15.

Resistors R1 and R2 in the first portion of the preamplifier/interface circuits shown in FIG. 7 are selected in resistance value to adjust the relative gains of the amplifiers for the front and rear microphone elements, respectively. Thus, it is possible to compensate for individual electro-acoustical differences between microphone elements, so that all such properly adjusted microphones may be interchanged with uniform results. Typically, resistors R1 and R2 may be selected so that the outputs of the front and rear preamplifier/interface circuits which appear on conductors 121 and 123 (FIG. 8), differ by 9.54 dB when sound is incident to the microphone at an angle of 60° from the front.

The first portion of the preamplifier/interface circuits transmits the microphone signals via the 3-wire cable to the second portion of the preamplifier/interface shown in FIG. 8. A 3-terminal connector 111 receives the microphone element signals from the 3-wire cable for conversion and amplification by respective amplifier networks generally indicated by reference numerals 113, 115. The amplifier networks convert the 3-wire signal to a pair of amplified audio voltages for further conversion by the remaining circuitry. The amplifier networks are conventional, constructed from operational amplifiers 117, 119, transistors Q1, Q2, resistors R5 through R23, capacitors C3 through C17, and diodes D1, D2, connected as shown.

The output of amplifier networks 113, 115 appear as voltage signals on conductors 121, 123 for transmission to gain/spectrum equalization circuits 69, 71. The equalization circuits modify or shape the amplified microphone signal in terms of magnitude versus frequency.

The equalization circuits emphasize the speech portions of the frequency spectrum in an attempt to filter high and low frequency signals which lie outside of the speech band. Also, since there is less energy in the high frequency parts of the speech band itself, for example "s" sounds, as compared to the energy in the low frequency parts of speech, for example, "m" sounds, equalization circuits 69, 71 also serve to emphasize the high frequency portions within the frequency band of speech.

In the embodiment shown in FIG. 8, the equalization circuits are constructed from operational amplifiers 125, 127, resistors R24 through R31, and capacitors C18 through C27, connected as shown.

After the microphone element signals have been modified by the gain/spectrum equalization circuits, the signals enter half wave log converter/filter circuit 73, 75 which convert the microphone element signals to a pair of D.C. levels. Operational amplifiers 129, 131 together with respective diodes D3, D4 perform a log conversion on the half wave of the modified microphone element signals. The log converted signals are further converted by respective diodes D5, D6 to a pair of D.C. voltage levels appearing across capacitors C28, C29. The D.C. levels are a reflection of the average A.C. logarithmic voltage. It is to be observed that increasing A.C. microphone element signals produce increasingly negative D.C. levels in this embodiment.

It is desirable to have a fast attack and moderately slow recovery of the average D.C. signals. When the sound signal becomes louder rapidly, the D.C. levels across capacitors C28, C29 follow quickly and when the sound signal becomes quiet, the recovery rate is slower.

Gain offset trim 77 is formed from a variable resistor R32 which produces a D.C. bias offset. The gain offset effectively serves to increase the rear microphone element signal by, for example, approximately 9.54 dB greater than the front microphone element signal. Thus, when the D.C. voltages across capacitors C28, C29 are equal, the front microphone element signal exceeds the rear microphone element signal by 9.54 dB. The gain offset trim serves further to compensate for circuit component tolerances. In the embodiment shown in FIG. 8, the half wave log converter/filter circuits 73, 75 further include resistors R33 through R44, protection diodes D7, D8 and protection LED diodes D9, D10, connected as shown.

Figure 9:
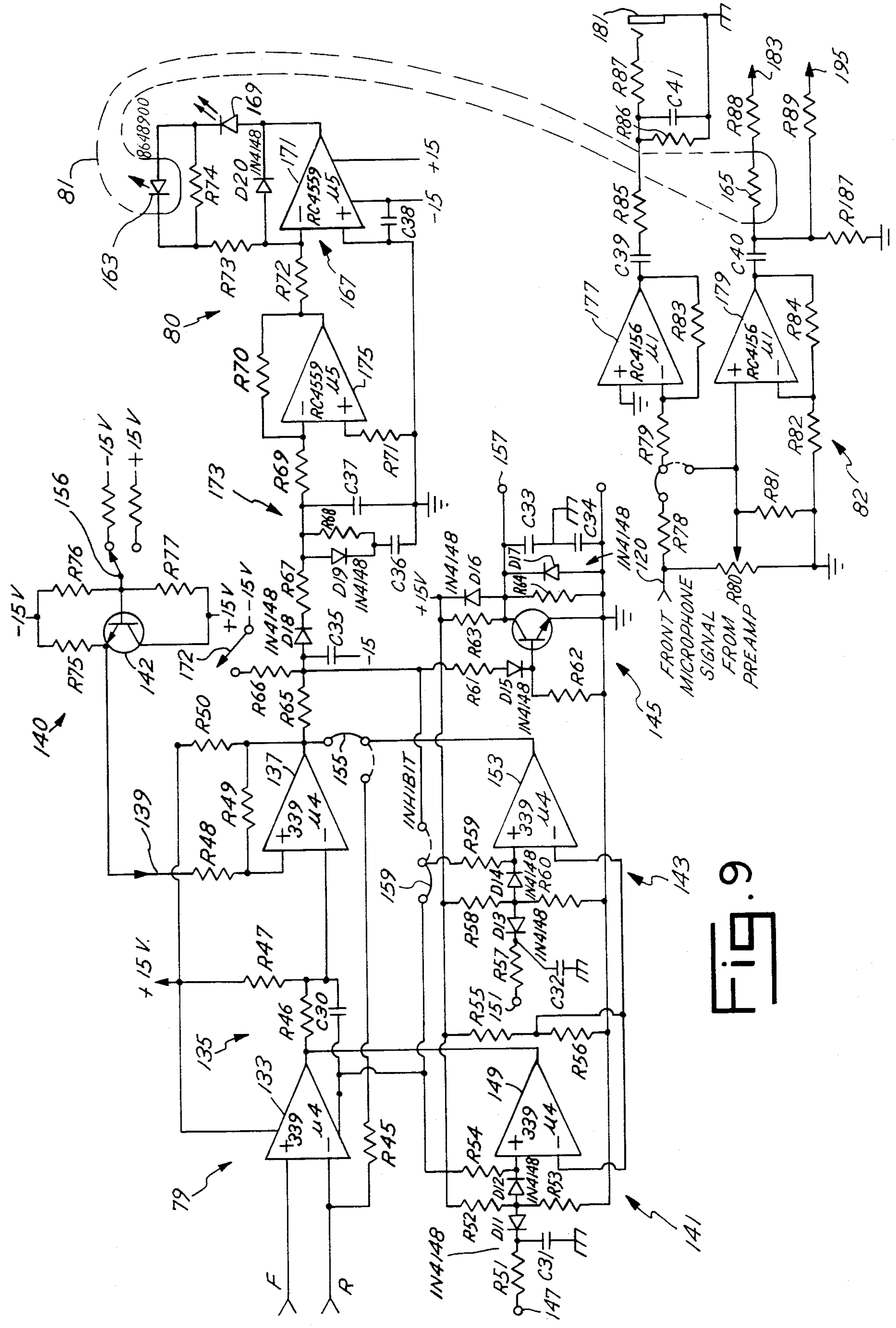

The D.C. outputs of log converter/filter circuits 73, 75 are transmitted to level comparator/hold/logic circuitry 79 illustrated in more detail in FIG. 9. A conventional comparator 133 receives the D.C. levels appearing across capacitors C28, C29 for comparing the D.C. voltage of the front microphone element (capacitor C28) with the D.C. voltage of the rear microphone element (capacitor C29). Comparator 133 generates a logic LOW output if the front microphone element signal is greater than or equal to the rear microphone signal. A logic HIGH output is generated by comparator 133 if the front microphone element signal is less than the rear microphone element signal.

The logic output of comparator 133 is received by a pulse stretcher circuit 135 which includes resistors R46, R47 and capacitor C30. The pulse stretcher circuit serves to bridge over the pauses in speech by keeping the microphone channel activated for a predetermined hold time.

Capacitor C30 is pulled to a −15 volts by a logic LOW output from comparator 133. When the comparator switches to its HIGH output, capacitor C30 discharges for a period of time determined by resistor R47. The particular time over which the logic HIGH output is stretched is controlled by a second comparator 137.

Comparator 137 effectively monitors the rise of the voltage across capacitor C30, generating a logic HIGH output until capacitor C30 decays to a predetermined voltage level. The predetermined level is established by the magnitude of a reference voltage appearing at the non-inverting input of comparator 137. A hold time bus 139 provides a selectable reference voltage level to comparator 137. The reference level is selectable by the operator for establishing a pause/hold time of either one half or one second.

The hold time of one half or one second may be selected via a circuit 140. Circuit 140 includes a transistor 142 connected as an emitter follower to provide a voltage onto hold time bus 139. A voltage divider network comprising resistors R75 through R77 serve to provide the proper voltage level along hold time bus 139 in accordance with the position of a switch 156.

The comparator/hold portion of circuitry 79 also includes resistors R48 through R50, connected as shown. Comparator 137 includes hystersis to prevent oscillation.

Circuitry 79 further includes a logic portion comprised of an override logic control 141, a mute logic control 143, and a logic output circuit 145. Override logic 141 includes an input node 147 which is connected to an external control switch (not shown). The external control switch drives node 147 to ground in order to force the particular microphone channel "on". A comparator 149 is responsive to grounding of node 147 in order to provide a logic level which is fed to pulse stretcher 135 for charging capacitor C30 turning "on" the microphone channel.

Mute control 143 also includes a circuit node 151 which is connected to an external control switch (not shown). The grounding of node 151 serves to force the particular microphone channel "off". A comparator 153 is responsive to grounding of node 151 in order to provide a logic level at its output.

A jumper 155 may be utilized to connect the output of comparator 153 to either the inverting input of comparator 133 or to the output of comparator 137. In either case, the microphone channel is muted by comparator 153. However, where jumper 155 is in the position of the dotted line, then when both the override and the mute switch are activated, the override switch rules; however, where jumper 155 is positioned according to the darkened line, then when both the override and mute switch are activated, the mute switch rules.

Logic output circuit 145 receives the logic signal produced by comparator 137 for generating a logic output at a circuit node 157 indicative of whether the microphone channel is "on" or "off". The logic output signal at node 157 may be utilized in various manners including, for example, the lighting of an LED in order to indicate that its associated microphone channel is "on".

Also, the microphone system may be constructed to operate so that the gating "on" of one microphone channel 11 serves to inhibit further gating of other microphone channels. To do so, a jumper 159 (FIG. 9) is changed to an inhibit position across the dotted line so that comparator 153 receives at its non-inverting input the logic signal developed by comparator 137. Further, all of the mute input nodes 151 (of the mute circuits associated with all microphone channels 11) are wired together in parallel with all output nodes 157 of the logic controls 145. Thus, when any one channel turns on, its logic output circuit 145 attempts to drive all mute controls 143 to mute its respective microphone. However, the one microphone that turns on provides a logic level to its comparator 153 disconnecting its mute control logic 143. Thus, the first microphone to turn on serves to prevent the other microphones of the system from being actuated until the speaker discontinues his speaking for a time greater than the pause time previously discussed.

The output of level comparator/hold/logic circuitry 79 is transmitted to audio switch drive 80 which controls the actuation of main resistive switch 81. Main resistive switch 81 is an optical isolator and includes a light emitting diode 163 which serves to control the effective resistance of a light dependent resistor 165. A voltage-to-current converter 167 drives current through LED 163 and through a second LED 169. LED 169 serves as an indicator light for indicating that the particular microphone channel is turned "on". A resistor R74 is connected in parallel across LED 163 and serves to transfer any leakage current away from LED 163 to ensure that the LED is kept off when the channel is not gated "on". The voltage to current converter 167 further includes an operational amplifier 171, resistors R72, R73 and protection diode D20.

A wave shaping circuit, generally indicated by reference numeral 173, serves to shape the logic signal generated by comparator 137. Wave shaping circuitry 173 has several primary timing concerns. One concern is to provide a smooth transition when gating the channel "on". When the channel is turned "off", the current waveform through LED 163 drops rapidly to a specified low level of current and then tapers off gradually.

Wave shaping circuitry 173 includes a D.C. amplifier 175, with connected resistors R69 through R71, which provides proper scaling of the voltage input to voltage-to-current converter 167. The logic voltage from the output of comparator 137 is shaped by diodes D18, D19, resistors R65, R67, R68 and capacitors C35, C36, C37 prior to scaling by amplifier 175. An attack voltage is developed across capacitor C37 which provides a smooth but rapid turn-on for the microphone channel.

When the channel turns off, the logic voltage drops at comparator 137 and the voltage developed across capacitor C37 discharges rapidly. However, capacitor C36 retains its voltage for a slower decay time during its discharge through resistor R68. During the discharge of capacitor C36, the gain of amplifier 175 is effectively changed due to the value of resistor R68. The continued discharge of capacitor C36 as well as the change in gain of amplifier 175 provides the previously discussed shaping of the current during turn off of the microphone channel.

As shown in FIG. 9, a channel off switch 172 is operable for connecting −15 volts to the front end of wave shaping circuit 173. The channel off switch is connected to the channel volume control and will switch closed at the off position of the control. Thus, the user may unconditionally turn the channel off rather than merely attentuate the channel with the volume control. With attenuation only, the overall gain of the system is still affected. The channel off switch 172 permits the operator to turn off the channel completely including the channel's gain effects.

Main resistive switch 81 serves to transfer the front microphone element signal to mixer 83. The front microphone element signal is retrieved on conductor 120 from the output of the preamplifier circuit 113 and fed through a gain circuit 82 comprised of operational amplifiers 177, 179, resistors R78 through R89, and capacitors C39 through C41, connected as shown. Resistor R80 serves as a volume control which is actuable by the operator of the system.

The front microphone element signal is passed to a main mixer bus 183 via series connected resistor 165 and resistor R88. A small portion of the microphone signal is also passed to a back ground mixer bus 195 via resistor R89 despite non-actuation of the microphone channel. The quantity of the small portion of signal placed on the background mixing bus may be variable or fixed as will suggest itself. The microphone channel need not turn completely "off". This can make the microphone switching as smooth and unobtrusive as possible.

A direct output connector 181 receives the front microphone signal irrespective of actuation of main resistive switch 165. This allows the user to have access to each front microphone element signal separately, where desired.

Figure 10:
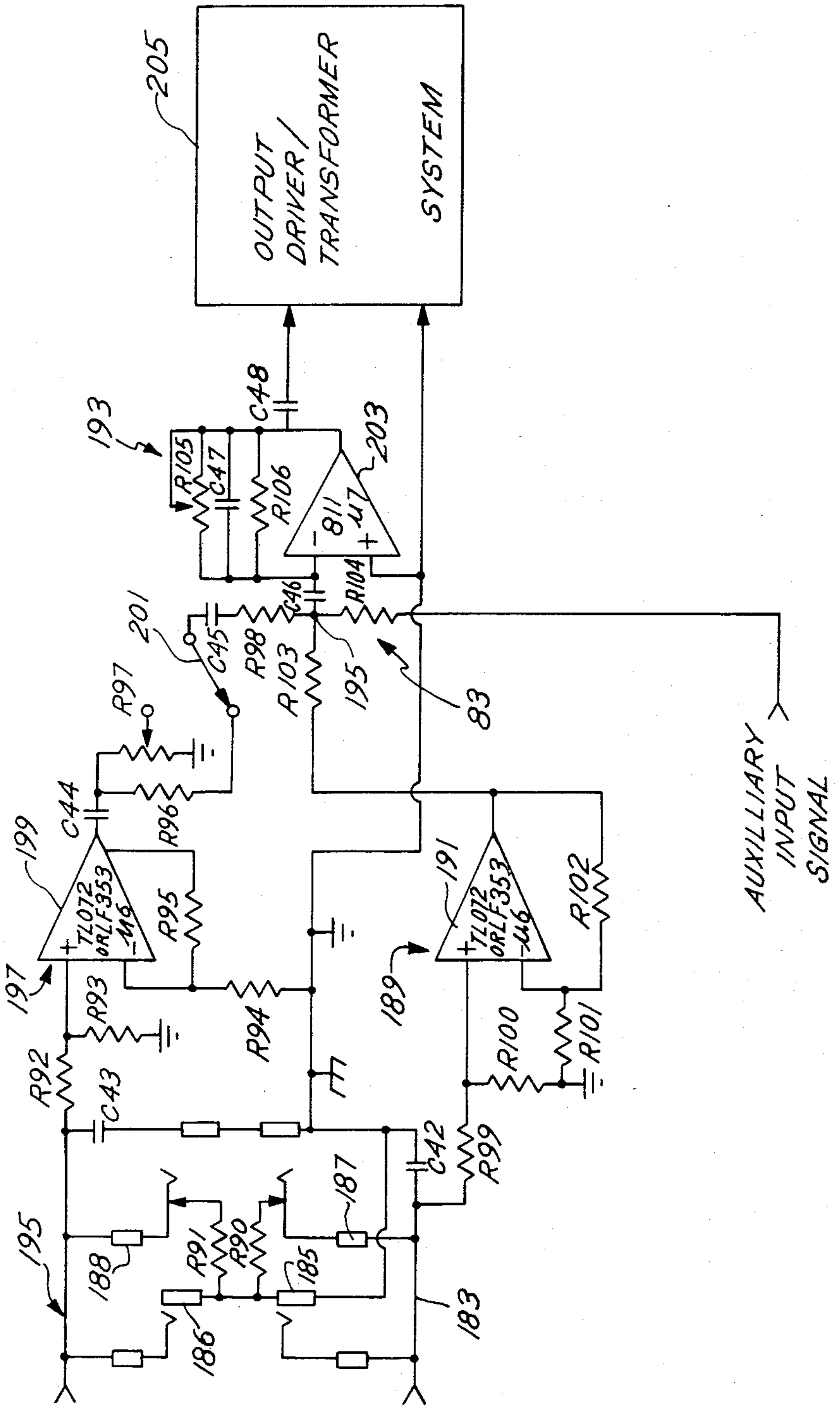

The microphone element signal which passes through the main resistive switch 165 appears on the main mixing bus 183 together with the microphone signals of other microphone channels, as shown in FIG. 10. The bus has a loading impedance of 5.6 K ohms. The main mixing bus is connected to ground via a resistor R90 which is illustrated connected across connector terminals 185, 187. The connector connects the main mixing bus with respect to ground into a gain stage 189 at the front of mixer 83. The gain stage is comprised of amplifier 191, capacitor C42 and resistors R97 through R102. From the gain stage, the gated microphone element signals are sent to an input node 195 of a variable gain stage 193 via resistor R103.

At input node 195, the microphone signals are combined with the background signals via resistor R98 and with an auxiliary signal via resistor R104. The background signals enter at background bus 195 which passes into a gain stage 197 comprised of amplifier 199, resistors R92 through R97, and capacitors C43, C44, C45. The background bus is connected to ground via a resistor R91 which is illustrated connected across connector terminals 186, 188.

The main mixing bus 183 has a loading impedance of 5.6 K ohms. For each microphone channel turned "on", the bus is loaded with an additional 5.6 1 K ohm resistance. When the first microphone turns "on", the initial loss will be 6 dB. When the second microphone comes "on", a 9.5 1 dB loss will occur, and so on. Thus, the number of microphones turned "on" serves to automatically adjust the gain in the system.

A switch 201 is utilized in the gain stage 197 in order to select a fixed amplification of the signal on the background bus or to permit a variable control to the signal.

The auxiliary signal which is combined at node 195 may be entered via an auxiliary connector (not shown) and appropriate gain stage, as will suggest itself. The three combined signals at node 195 enter the variable gain stage which is constructed from an amplifier 203, resistors R105, R106 and capacitors C46 through C48, connected as shown. Resistor R105 serves as the main output level control for the mixer.

The output of variable gain amplifier 193 may be fed to a conventional output driver/transformer system 205, to provide the signal to, for example, a conventional amplifier/speaker system.

The following circuitry values are given:

| Resistors | Ohms |
|---|---|
| R1, R2 | 510 to 2.0K (selected) |
| R3, R4 | 180 |
| R5, R14 | 8.2K |
| R6, R8, R10, R16 | 300 |
| R7, R13, R15, R20, R116, R121 | 100 |
| R11, R19 | 82K |
| R12, R18, R52, R55, R58, R75, R77, | 150K |
| R17, R9 | 120K |
| R21, R64 | 15K |
| R22, R23 | 9.1K |
| R24, R25, R28, R29, R80, R81, R97, R98, R102, R103, R104, R32 | 10K |
| R26, R30, R70, R71 | 200K |
| R27, R31 | 2.7K |
| R33, R40, R41, R93, R100 | 10 meg. |
| R34, R42 | 1.1K |
| R36 | 18 meg. |
| R38 | 270K |
| R39 | 10 |
| R43 | 22 meg. |
| R45 | 6.8 meg. |
| R46 | 3K |
| R47 | 2.2 meg. |
| R48, R83 | 51K |
| R49, R54, R59, R68 | 1.5 meg. |
| R50 | 3.3K |
| R53, R60 | 91K |
| R56 | 22K |
| R61, R90 | 5.6K |
| R35, R44, R51, R57, R87 | 200 |
| R63, R74, R78 | 30K |

-continued

| | |
|---|---|
| R62, R65 | 2K |
| R66 | 4.3K |
| R67, R69, R105, R106, R187 | 100K |
| R72 | 750 |
| R73 | 390 |
| R76 | 430K |
| R79, R84 | 20K |
| R82, R91 | 1K |
| R85, R88 | 5.1K |
| R86 | 820 |
| R89 | 11K |
| R92, R99 | 2.2K |
| R94 | 1.5K |
| R95 | 16K |
| R96 | 18K |
| R101 | 3.3K |
| **Capacitors** | **Capacitance** |
| C1, C2, C3, C4, C31, C32, C33, C34 C41, C42, C43 | 100 pF |
| C5, C8 | 100 μF |
| C7, C15 | 470 pF |
| C6, C14, C45 | .68 μF |
| C9, C10, C16, C17 | 20 pF |
| C11, C18 | 4.7 μF |
| C12, C13, C38 | .047 μF |
| C19, C23, C36 | .1 μF |
| C20, C24 | 150 pF |
| C21, C22, C25, C26 | .15 μF |
| C27, C39, C40, C46, C48 | 10 μF |
| C28, C29, C44 | .68 μF |
| C30 | .33 μF. |
| C35, C37 | .22 μF |
| C47 | 68 pF |

It should be understood, of course, that the foregoing disclosure relates to a preferred embodiment of the invention and that modifications or alterations may be made therein without departing from the spirit or scope of the invention as set forth in the appended claims.

What is claimed is:

1. A sound system having an amplifying means responsive to a microphone signal for amplifying said signal, said system comprising:

a microphone housing;

a microphone array secured within said housing and having a first microphone element with directional characteristics such that the relative sound sensitivity of said first element varies in accordance with the angle of incidence of sound relative to said element, and having at least a second microphone element secured in said housing in a fixed relationship to said first element, each of said microphone elements for receiving sound and each for generating a respective output signal, the ratio of the amplitudes (differences in decibels) of said output signals of said first and second elements being a function of the angle of incidence of the sound relative to said array;

logic circuit means for receiving each said respective output signals from at least said first and second microphone elements, said logic circuit responding to at least one said ratio to determine if the sound is incident from a particular area of space, said logic circuit means generating a gating signal solely when said sound is incident from said particular area of space; and gate circuit means responsive to said gating signal for passing the said output signal of at least one microphone element of said array to said amplifying means for amplification.

2. A system according to claim 1 wherein said microphone array has two microphone elements, said array having a 3-wire output cable for carrying the output signals of both said microphone elements.

3. A system according to claim 1 wherein said microphone elements are unidirectional microphones mounted in a back-to-back relationship.

4. A system according to claim 1 wherein said logic circuit means incudes comparator means for comparing the ratio of amplitudes of said output signals with respect to a threshold value.

5. A system according to claim 4 wherein said comparator means includes a threshold means manually controllable for presetting said threshold value.

6. A system according to claim 1 wherein said logic circuit means includes: logarithmic converter means for converting the amplitudes of said output signals to respective D.C. signal levels representative of the logarithmic value of said amplitudes; and comparator means for comparing the difference in amplitudes of said D.C. signal levels.

7. A system according to claim 1 and further including stretching means for stretching said gating signal.

8. A system according to claim 1 and further including means for controlling the waveform shape of said gating signal upon termination thereof.

9. A system according to claim 1, wherein said logic circuit means includes:

logic means for monitoring the relative amplitudes of the output signals of said first and said second microphone elements, said logic means generating a logic ON signal responsive to a predetermined ratio relationship existing between said output signals of said first and said second signals; and switch means responsive to said logic ON signal for gating said output signals of said first microphone element to said output means.

10. A microphone system according to claim 9, wherein said logic circuit means includes preamplifier means for receiving said output signals of said first and second microphone elements and for outputting amplified respective first and second electrical signals to said logic means.

11. A microphone system according to claim 10, wherein said logic circuit means includes equalization means for amplifying said first and second electrical signals as a function of frequency.

12. A sound system according to claim 1 wherein said logic circuit means generates a logic signal indicative that reception of sound by a said microphone is from a predetermined area of space;

gate means responsive to a said logic signal for gating a microphone signal to said amplifying means; and inhibiting means responsive to a said logic signal for inhibiting the gating of all but one of said microphone signals to said amplifying means, said one of said microphone signals being the signal associated with the microphone first in time to cause generation of said logic signal.

13. A sound reinforcement system according to claim 12 wherein said inhibiting means is connected to said logic circuit means for preventing generation of logic signals for all but said one microphone signal.

14. A sound reinforcement system according to claim 13 wherein said logic circuit means includes a plurality of gate signal actuators, each said gate signal actuator being associated with one of said microphones; and wherein said inhibiting means includes a plurality of inhibit circuits, each said inhibit circuit associated with one of said gate signal actuators, each said gate signal actuator responsive to the output of any of said gate signal actuators for generating an inhibit signal, each said inhibit circuit receiving the output of its respective gate signal actuators for inhibiting generation of said inhibit signal.

* * * * *